Aug. 23, 1966   J. HEATHCOTE   3,267,911
SUPERCRITICAL STEAM POWER PLANTS
Filed Nov. 20, 1964   2 Sheets-Sheet 1
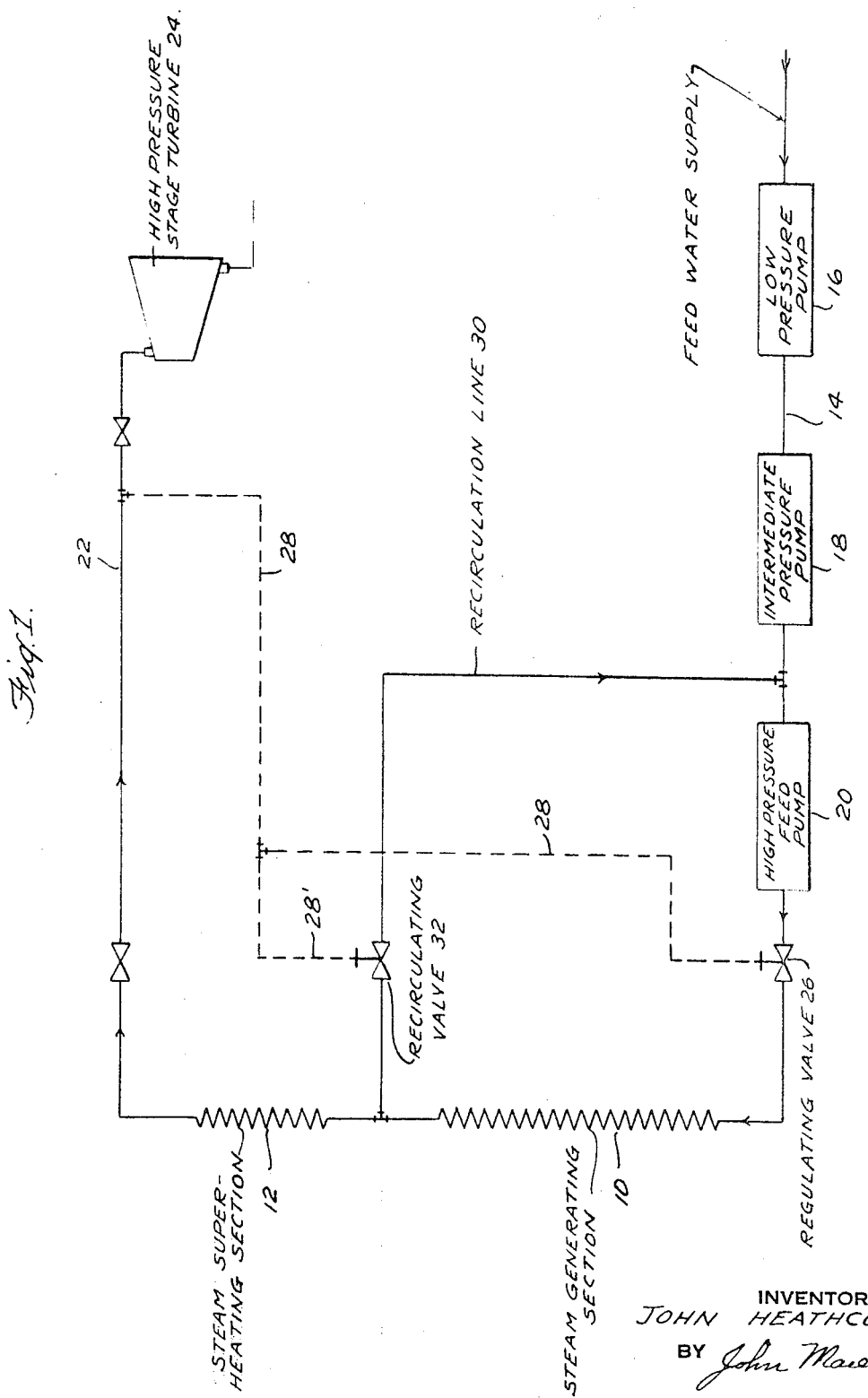
Fig.I.
INVENTOR
JOHN HEATHCOTE
BY John Maier, III
ATTORNEY Aug. 23, 1966  J. HEATHCOTE  3,267,911
SUPERCRITICAL STEAM POWER PLANTS
Filed Nov. 20, 1964  2 Sheets-Sheet 2
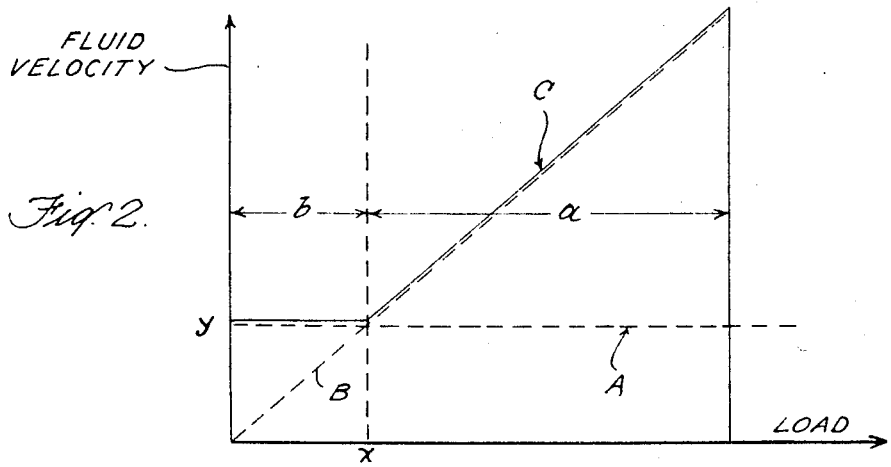
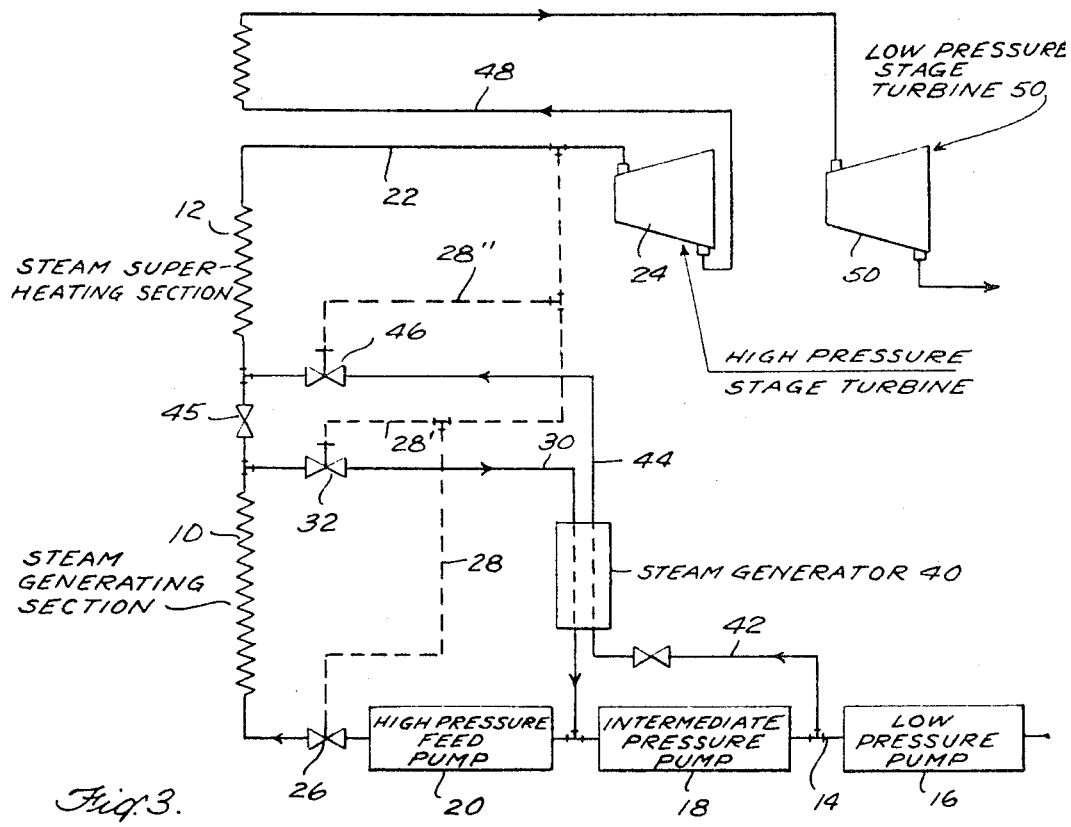
INVENTOR
JOHN HEATHCOTE
BY John Maur
ATTORNEY

United States Patent Office 3,267,911
Patented August 23, 1966

3,267,911
SUPERCRITICAL STEAM POWER PLANTS
John Heathcote, New Malden, England, assignor to Foster Wheeler Corporation, New York, N.Y., a corporation of New York
Filed Nov. 20, 1964, Ser. No. 412,764
Claims priority, application Great Britain, Feb. 5, 1964, 4,928/64
4 Claims. (Cl. 122—406)

This invention relates to steam power plants and in particular to supercritical steam power plants, that is to say plants in which the pressure of the working fluid is above the critical value of the fluid. The terms "water" and "steam" used throughout this specification will be understood to include any other suitable liquid and its vapor unless the context otherwise requires.

It can be readily demonstrated that the work obtainable in a steam power plant cycle is materially greater for supercritical conditions than for sub-critical conditions. Operation above the critical pressure, however, leads to certain requirements due to the fact that water at supercritical pressure passes directly without boiling into steam of virtually the same density as the water when heated to the critical temperature. Under supercritical conditions, therefore, there is, in effect, no phase change when the water changes into steam so that it is necessary for heating of the water to be effected in a once-through tube system; that is to say a tube system in which water at high pressure enters at one end to emerge at the other end as high pressure superheated steam.

During start-up and shut-down of a fired steam power plant, it is essential to maintain a certain minimum rate of flow of heated fluid through the furnace tubes in order to avoid the danger of tube burn-out. In the case of power plants having heating tubes operating on natural-circulation or forced-circulation principles, the furnace tubes are always protected by the recirculated water whose flow rate remains above the safe minimum during periods of low-load, but when the furnace tubes are part of a once-through system the problem is not so easily solved, as one of the characteristics of a conventional once-through system is that the rate of flow of heated fluid through the tubes is directly proportional to the steam requirements so that during periods of low load the fluid flow rate through the furnace tubes will be correspondingly low, and below a certain load will be below the minimum required to insure tube protection.

The object of the invention is to provide a supercritical steam power plant in which a fluid velocity adequate to prevent tube burn-out can be insured over all loads in a comparatively simple manner.

In the supercritical steam power plant in accordance with the invention, a minimum fluid velocity through the furnace tubes is insured by maintaining the flow of fluid to the inlets to the furnace tubes at or above a value required to insure this minimum velocity at all loads, and at low loads, when the steam requirements are lower than would be generated from this minimum flow of feedwater, withdrawing from and recirculating through the furnace tubes the excess heated fluid.

During normal periods of operation of the plant, the flow of feedwater to the furnace tubes is controlled in response to steam demand in the conventional manner either by a valve or a variable speed feed pump operated by a signal derived from the pressure of the steam entering the high pressure stage turbine, and a valve controlling the recirculation of the heated fluid remains closed. When, in a period of decreasing load, the volume of feedwater admitted by the feed valve or pump falls to the minimum which will insure the desired minimum fluid velocity through the furnace tubes, the control signal is transferred to the valve controlling the heated fluid recirculation while the feed valve or pump continues to allow that minimum volume of fluid to be admitted to the furnace tubes. On a further decrease of the load, the recirculation valve opens to allow the excess heated fluid from the tubes system to be withdrawn and combined with the feedwater flow at a point upstream of the feedwater control valve.

In this way, the steam produced by the plant does not exceed demand, while at the same time the flow of fluid to and through the furnace tubes does not fall below that required to insure protection of those tubes against burnout.

In a period of progressively increasing demand from a low level, the control signal progressively closes the heated fluid recirculation valve until the point is reached when the steam demand corresponds to rate of flow of feedwater which is just sufficient to insure the required furnace tube protection, when the control signal closes the recirculation valve and is transferred to the feedwater control valve or pump, which, as has been noted above, throughout this low-load period remains at a setting which will admit to the furnace tubes sufficient fluid to obtain tube protection. Thereafter, the feedwater control valve or pump is controlled in response to steam demand while the recirculation valve remains closed until the steam demand again falls below the value necessary for protection of the furnace tubes when the control signal is again returned to the recirculation valve.

Preferably, the feedwater control valve is mechanically prevented from closing beyond the minimum opening required to admit to the furnace tubes sufficient feedwater to protect those tubes.

The invention is diagrammatically illustrated in the accompanying drawings in which:

FIGURE 1 is a flow diagram of a fired steam power plant in accordance with the invention;

FIGURE 2 is a fluid velocity load diagram illustrating operation of the plant shown in FIGURE 1; and FIGURE 3 is a flow diagram of a modified form of plant in accordance with the invention.

The plant illustrated in FIGURE 1 of the drawings has a once-through tube system which provides for the water to be heated by a steam generating section 10 and a stream superheating section 12 in series with the steam generating section. Feedwater is supplied to the tube system through a line 14 containing in series a low pressure pump 16, an intermediate pressure pump 18, and a high-pressure pump 20 for raising the pressure of the feedwater to above the critical value. The water flowing through the steam generating section 10 of the tube system is heated by indirect heat exchange with a heating fluid circulated over the tubes and by radiant heat until it reaches its critical temperature when it passes directly into steam without boiling. This steam is then passed to and through the superheating section 12, where it is further heated. High-temperature supercritical steam leaves this section through a line 22 and is passed to the first, or high-pressure stage 24 of the multi-stage supercritical steam turbine.

The supply of feedwater to the tube system is controlled by a regulator valve 26 located in the line 14 between the high-pressure feed pump 20 and the inlet to the steam generating section 10. The operation of the valve 26 in response to varying steam demand is by a signal, indicated by the dotted line 28, derived from the pressure of the supercritical steam passing from the superheating section 12 to the high-pressure stage turbine 24 through the line 22.

To provide at periods of low load for recirculation of the heated fluid which has passed through the steam generating section 10, there is a line 30 which communicates the outlets from the section 10 to the line 14 carrying the feedwater to the tube section at a point between the intermediate pressure feed pump 18 and the high-pressure feed pump 20. The proportion of heated fluid recirculated is controlled by a valve 32 which during periods of normal operation of the plant remains closed so that there is no recirculation, but at periods of low load (say below about 30% of full load) is opened to allow recirculation of the excess fluid passing through the steam generating section 10. Operation of the recirculation valve 32 is by means of the signal 28 which, when the opening of the feedwater control valve 26 is reduced to the minimum consistent with insuring a supply to the tube system of a flow of feedwater adequate for the protection of the tubes of the steam generating section 10, is automatically transferred from the feed valve 26 to the recirculation valve as indicated by the dotted line 28'.

After the pressure control signal 28 has been transferred to the recirculation control valve 32 (i.e., has become control signal 28'), the opening of the feedwater control valve 26 remains constant, so that the flow of fluid (now partly recirculated heated fluid from the outlet end of the steam generating section 10 and partly feedwater) to the inlet end of the steam generating section 10 remains constant at a value sufficient to insure an adequate fluid velocity through the tubes of that section.

The effect of the transfer of the pressure control signal to and from the valve 32 on the operation of the plant described above will be readily understood from FIGURE 2, which is a graph of fluid velocity in the tubes of the steam generating section 10 plotted against the load on the plant. The horizontal line A indicates the minimum fluid velocity to insure protection against burn-out of the tubes of the steam generating section. The diagonal dotted line B indicates the fluid velocity $y$ required to meet steam demand over the entire load range, and it will be observed that at low loads (in practice usually below about 30% of full load), the required fluid velocity is below the safe velocity indicated by the line A.

In the load region $a$, the recirculation valve will remain closed, and the flow of feedwater will be controlled by the pressure control signal effecting the setting of the feed regulator valve 26 in response to changes in the load within this region. When the load decreases the value $x$ which corresponds to the minimum safe fluid velocity, the control signal is transferred to the recirculation control valve, and the feed valve remains static and open sufficiently to allow the minimum flow rate for tube protection. As the load decreases further and enters the region $b$, the recirculation control valve 26 will open to allow excess heated fluid to be recirculated, the proportion of the heated fluid being recirculated being controlled by the setting of this valve which itself is controlled by the pressure signal gauging steam demand.

Thus at all loads, the steam produced by the plant will not exceed the demand, but at the same time in the load region $b$ the fluid velocity will remain constant at the value $y$ required for the tube protection, i.e., the fluid velocity in the plant in accordance with the invention will be as indicated in FIGURE 2 by the full line C.

One particular advantage of the plant described above is that the recirculation of the excess heated fluid to a point between the intermediate and high-pressure feed pumps 18 and 20 respectively obviates the necessity for a recirculation pump.

Another advantage of the plant described above is that during periods of recirculation the temperature of the fluid handled by the high-pressure feed pump does not exceed the temperature of the feedwater at full load. Therefore, no special design of pump is required.

Although not described, above precautions will usually be taken to avoid overheating of the superheater tubes during low load periods, especially if these tubes are subjected to radiant heat.

FIGURE 3 illustrates a modification of the plant shown in FIGURE 1 to enable the plant to be started up in a comparatively short time and with comparatively small heat losses.

The plant shown in FIGURE 3 is identical to that shown in FIGURE 1 except that it includes a start-up, sub-critical steam generator or heat exchanger 40 through which is passed by a line 42, water at sub-critical pressure withdrawn from the feed line 14 at a point between the low pressure and intermediate pressure feed pumps 16, 18 respectively. Within the steam generator 40, the water withdrawn into the line 42 is converted into steam by indirect heat exchange with the hot supercritical fluid which during start-up (i.e., low load conditions) is recirculated through line 30 in the manner described with reference to FIGURE 1. The sub-critical steam thus generated is passed from the steam generator 40 by a valve-controlled by-pass line 44 to the inlet to the superheating section 12 and from the superheating section through the line 22 to the high-pressure stage turbine 24. A pressure reducing valve 45 located between the steam generating section 10 and the superheating section 12 reduces the pressure downstream of the valve 45 to a pressure below that leaving the low pressure pump 16.

The flow of sub-critical steam from the heat exchanger or steam generator 40 to the turbine is carefully controlled to achieve the steam conditions required to warm, roll, run up to speed, and synchronize the turbine. The control is effected by operating a valve 46 controlling the volume of water entering the steam generator 40 in response to temperature and pressure signals 28" derived from the line 22 at the turbine stop valve (not shown).

When the turbine has been synchronized, which may be possible at a load of 10% or less of the full load, the system is then run up to full load by passing a progressively increasing amount of steam from section 10 to the superheating section 12 and, simultaneously, reducing the load on the steam generator 40.

Because of the high heat transfer coefficient (supercritical water to sub-critical boiling water) in the start-up steam generator 40, the heating surface requirements of this steam generator need only be comparatively small. Further, control of both the furnace tube cooling and the start-up steam conditions at the turbine can be readily and simply controlled, thus minimizing the dangers of furnace tube burn-out and thermal shock to the turbine casing.

FIGURE 3 also illustrates the reheat cycle generally designated 48, between the high-pressure stage turbine 24 and an intermediate pressure stage turbine 50 which will invariably be provided in the plants in accordance with the invention.

Although the invention has been described in its preferred form with a certain degree of particularity, it is understood that the present disclosure of the preferred form has been made only by way of example and that numerous changes in the details of construction and the combination and arrangements of parts may be resorted to without departing from the spirit and scope of the invention as hereinafter claimed.

What is claimed is:

1. A circuit arrangement for a forced flow once-through steam generator comprising:

a low pressure pump, an intermediate pressure pump, and a high pressure pump, all connected in series with the low pressure pump upstream of the intermediate pressure pump and the high pressure pump downstream of the intermediate pressure pump, a first signal-actuated flow control valve connected downstream of said high pressure pump, a first heating section of heat-absorbing conduit connected downstream of said first signal-actuated flow control valve, a pressure-reducing valve located downstream of said first heating section, a second section of heat-absorbing conduit connected downstream of said first heating section, a recirculation conduit connected at one end between said first heating section and said pressure-reducing valve and at the other end between said intermediate pressure pump and said high pressure pump, said high pressure pump being adapted to increase the pressure downstream of said first heating section over the pressure downstream of said intermediate pump, a second signal-actuated flow control valve located in said recirculation conduit, a by-pass conduit connected at one end between said pressure-reducing valve and said second heat-absorbing section and at the other end between said low-pressure pump and said intermediate pressure pump, said pressure reducing valve being adapted to reduce the pressure downstream of said pressure-reducing valve to a pressure lower than the output pressure of said low pressure pump, a third signal-actuated flow control valve located in said by-pass conduit, a heat exchanger having two passageways therethrough, one of said two passageways located in said recirculation conduit and the other of said two passageways located in said by-pass conduit, and means adapted to apply a signal related to load conditions downstream of said second heating section to maintain only said first signal-actuated flow control valve open above a predetermined load condition and to close gradually to a preset position said first signal-actuated valve as said load condition decreases and then gradually to open said second signal-actuated flow control valve as said load further decreases, said means being further adapted to open said third signal-actuated flow control valve during start-up load conditions.

2. A circuit arrangement for a forced flow once through steam generator comprising:
   a first heating section of heat absorbing conduit,
   a second heating section of heat absorbing conduit connected downstream of said first heating section,
   a high pressure pump means and a low pressure pump means upstream of the high pressure pump means, the high pressure pump means being upstream of the first heating section,
   a first signal-actuated flow control means to control the flow from the high pressure pump means entering the first heating section and to maintain at least a predetermined minimum flow through the first heating section at all times during operation,
   a recirculation conduit connecting a first point between said first heating section and said second heating section and a second point between said low pressure pump means and said high pressure pump means, said high pressure pump means being adapted to add sufficient pressure to form a greater pressure level at said first point than at said second point whereby the direction of any flow through said recirculation conduit is from said first point to said second point,
   a second signal-actuated flow control means located in the recirculation conduit,
   means to actuate said first signal-actuated flow control means and said second signal-actuated flow control means in accordance with the load on the steam generator, said second signal-actuated flow control means being adapted to maintain a flow through the recirculation conduit in excess of the load requirement when the first signal-actuated flow control means is maintaining the predetermined minimum flow through the first heating section.

3. A circuit arrangement according to claim 2 whereby in said low pressure pump means includes two pumps in series.

4. A circuit arrangement according to claim 2 wherein said first signal-actuated flow control means is a valve and said second signal-actuated flow control means is a valve.

References Cited by the Examiner

UNITED STATES PATENTS

| 3,038,453 | 6/1962 | Armacost | 122—406 |
| 3,135,249 | 6/1964 | Schroedter et al. | 122—406 |
| 3,135,250 | 6/1964 | Argersinger | 122—406 |
| 3,194,219 | 7/1965 | Hanzalek | 122—406 |

KENNETH W. SPRAGUE, *Primary Examiner.*